United States Patent [19]

Lewiner et al.

[11] Patent Number: 4,825,462
[45] Date of Patent: Apr. 25, 1989

[54] DEVICES FOR DELIVERING INFORMATION ON THEIR COMMUNICATIONS TO SUBSCRIBERS OF TELEPHONE LINES

[76] Inventors: Jacques Lewiner, 5, rue Bory d'Arnex, 92210 Saint Cloud; Dominique Taudin, 4, rue Berthollet, 75005 Paris; Eric Carreel, 62, rue Brancion, 75015 Paris, all of France

[21] Appl. No.: 128,904

[22] Filed: Dec. 4, 1987

[30] Foreign Application Priority Data

Dec. 9, 1986 [FR] France .................. 86 17226

[51] Int. Cl.4 ................ H04M 1/56; H04M 15/08
[52] U.S. Cl. ................................................ 379/131
[58] Field of Search ............... 379/130, 113, 131, 140

[56] References Cited

U.S. PATENT DOCUMENTS 4,585,904 4/1986 Minicone et al. .................. 379/131

Primary Examiner—Stafford D. Schreyer
Attorney, Agent, or Firm—Larson and Taylor

[57] ABSTRACT

The invention relates to a device for providing the subscriber of a telephone line with information on the telephone calls made on his line. This device, connected to said line, beyond the general connection terminal of the corresponding station, comprises means for detecting and recording durably the numbers called corresponding to the calls successively made in the course of a predetermined period from the station as well as the costs of these calls, and means for displaying on a video screen of the Minitel type, the sequence of these numbers and costs in response to pressing the keys of a key board.

8 Claims, 1 Drawing Sheet

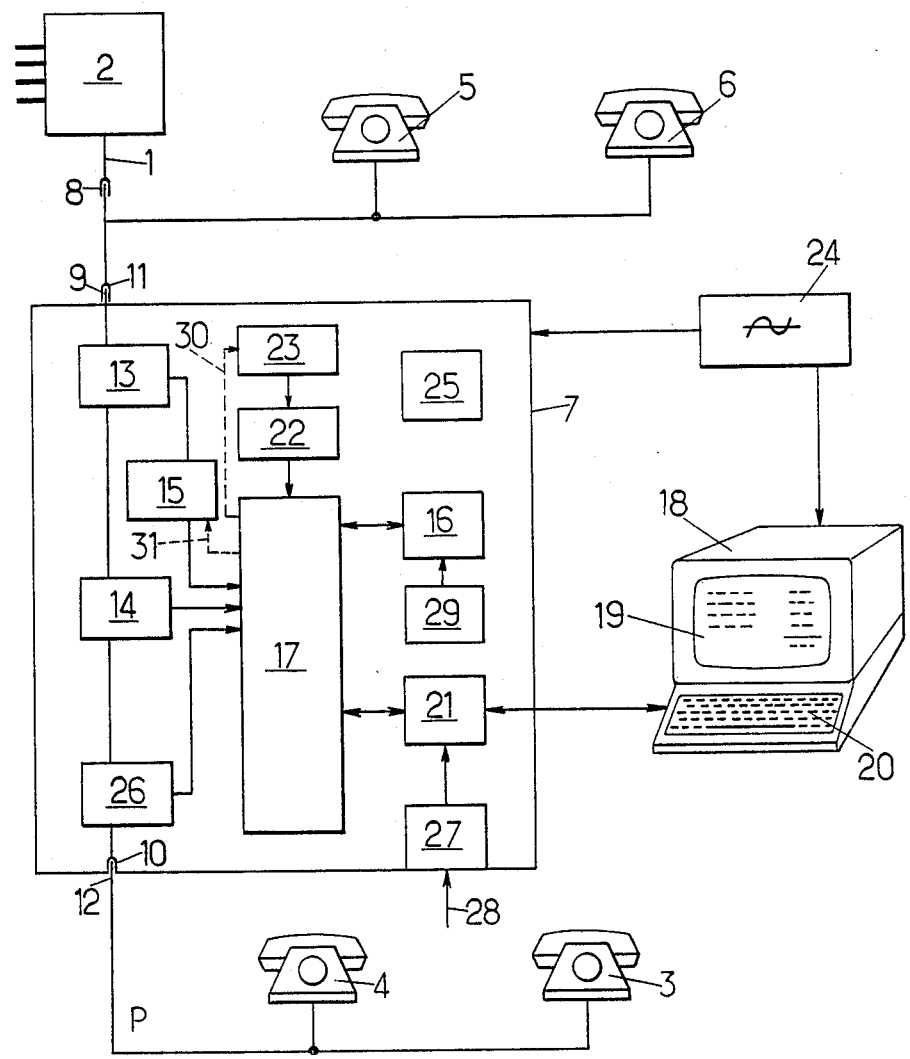

DEVICES FOR DELIVERING INFORMATION ON THEIR COMMUNICATIONS TO SUBSCRIBERS OF TELEPHONE LINES

The invention relates to devices enabling the delivery to subscribers—private or public— of telephone lines, information on the communications and other telephone services established on their lines, from the stations corresponding to their subscriptions.

Each telephone communication established from a subscriber's telephone set can trigger at the level of the telephone exchange to which this station is connected, the following operations:

the counting of the duration of the communication, measured in predetermined units of taxable time, of which units the durations may be, for example, equal to 3 minutes or to 12 seconds, the recording of the number called and of the exact moment (date and hour) of the start of the call.

Among these informations, only those relating to the "counting" can go back to the subscriber's station through the line concerned.

This counting can be manifested by the emission of counting pulses in the terms of the successive taxable time units corresponding to the communication.

Thus, in public telephone call boxes, the number, of these pulses, counted on the spot may be used to interrupt the communication when it reaches a value corresponding to a definite sum of money spent by the user for said communication, or again to be deducted proportionally from a credit card acquired, subject to payment, by the user of the call box and inserted in a suitable checking apparatus.

This type of exploitation is interesting, but it relates exclusively to the telephone calls in progress.

It is the same for devices which can be connected to telephone lines serving subscriber stations, beyond the general connecting sockets of these stations to these lines, on the side of said stations, said devices being arranged to print on the spot at said stations a certain number of details relating to each communication established from such a station, at the end of the latter, details such as the cost of this communication and the number of the subscriber called.

It has also been proposed to mount at the telephone sets of subscribers totalling meters enabling the latter to know the total amount of the taxes due for the calls made from the stations starting from a given date.

This equipment can provide certain services, but the data that they produce is only global.

Now there exist many cases for which subscribers would like to have available very quickly more precise details as regards the different calls made on their line during a given period of time which can as well extend over a relatively short period, of the order, for example, of one hour or of a half day, as over a normal period of subscription of the order of one, two, three months or even more.

Such data is, for example, the numbers called, the times and the individual costs corresponding to these various calls.

Some of these data may be transmitted to subscribers by the telephone administration in the form of monthly, quarterly or other statements of account.

It is a particular object of the invention to make possible immediate knowledge and on the spot of said details.

Accordingly, the information providing devices according to the invention comprise also, connected to the telephone line to be checked, means for detecting the number called and the costs of each communication established on this line from the station, and means for displaying on the spot these two details and they are essentially characterized in that they comprise in addition, also situated on the side of the subscriber's station, means for recording durably the numbers called so detected corresponding to the calls made successively in the course of a predetermined period T, means for recording durably the successive costs of these calls, and means adapted to display on a suitable display screen, the sequence of these numbers, with the corresponding costs of the calls, in response to very simple commands, such as pressing buttons on a key board.

In preferred embodiments, recourse is had in addition to one and/or other of the following features:

the display means are constituted by a telematic terminal of the type known under the trade name "Minitel", the device comprises in addition clock means for indicating the moments of the beginning and/or end of the successive communications, said moments being defined by the date, the hour and, if necessary, the minute concerned, means for durably recording this data and means for displaying the latter at the same time as the corresponding numbers called, the means for durable recording are constituted by electrically reprogrammable memories, the durable recording means are constituted by life memories with a protected supply, the device comprises in addition means for delivering the data which are recorded therein to the telephone line in response to a predetermined coded call, the device comprises safety means enabling the reservation, exclusively to persons entitled thereto, of the access to the data which are recorded therein, for the purpose of displaying these data, these means employing in particular the composition of a pass word.

The invention comprises, a part from these main features, certain other features which are preferably used at the same time and which will be more explicitly considered below.

In the following, a preferred embodiment of the invention will be described with reference to the accompanying drawing to be considered of course as non-limiting.

The single Figure of this drawing shows diagrammatically a device for providing information constructed according to the invention.

The information concerned relates to the whole of the telephone calls made successively in the course of a predetermined period T on a line 1 connecting to a telephone exchange 2 a subscriber's station P shown diagrammatically by a group of emitter-receiver apparatuses 3 to 6.

This station P can be public or private and can comprise a single combined telephone set or several such apparatuses, all connected to line 1 at the level of a general input and output terminal 8.

The information providing device according to the invention, shown diagrammatically by the rectangle 7 in the drawing, is also connected to the line 1, beyond the general input terminal 8 of this line 1 to the station P of the subscriber, on the side of the station, this connection being formed by means of respectively two male 9 and female 10 telephone sockets cooperating with two complementary sockets 11 and 12 of the telephone circuit.

In the embodiment illustrated, the telephone hand sets 3 and 4, mounted in parallel with one another, are both connected to the general terminal 8 through the device 7 whereas the two hand sets 5 and 6, also mounted in parallel with one another, are directly connected to the general terminal 8 and hence mounted in parallel with the device 7.

This device 7 comprises, mounted in series between the two sockets 9 and 10:

a circuit 13 adapted to detect the taxable units belonging to the different telephone calls made from any one of the apparatuses 3 to 6 of the station P, and a circuit 14 adapted to detect the telephone numbers called A for these various calls.

The circuit 13 is arranged so as to count the number N of periodic pulses of taxations which are sent to the line 1 in the course of each communication, from the exchange 2.

This circuit 13 is advantageously associated with the circuit 15 enabling the numbers N thus counted to be multiplied by numbers U corresponding to the price for unit taxes at the actual moments of the calls, so as to form the products NU corresponding to the actual costs of these communications.

Means are provided to modify the numbers U so as to take into account the development of taxes over time.

The data thus detected N, as well as the case may require the products NU if they are formed, are sent into a recording and exploitation unit comprising particularly a non-volatile memory 16 and a minicomputer 17.

The circuits corresponding to the minicomputer 17 are known in themselves, for example through French Patent No. 2 427 016, so that they will not be discussed in detail here.

The memory 16 is selected from a type, which has recently appeared on the market, such that on the one hand it preserves durably the data which are recorded therein, even after each cut-off of its electrical supply, and that on the Other hand, it may be reprogrammed electrically.

As to the circuit 14, it may be constituted in a manner known in itself by exploiting the numbering principle by a train of pulses or again the principle of numbering by vocal frequencies.

As for the signals formed by the circuit 13 and possibly by the circuit 15, and those formed by the circuit 14 are sent into the recording and computing units 16–17.

In addition—and here is one of the original aspects of the present invention—a video display apparatus 18 is provided associated with the device 7 and enabling the appearance instantaneously on its screen 19, by simply pressing the keys of a key board 20, of the contents of the memory 16, or more precisely of the call numbers of different communications established in the course of the period T as well as their amounts.

The device 7 is also made to comprise in addition an interface circuit 21 enabling the minicomputer 17 to be adapted to the display apparatus 18 so that the subscriber of the line 1 can cause the appearance very simply on the screen 19 of the different contents of the memory 16 by pressing certain keys of the key board 20 according to a program or "menu" displayed on the screen itself.

The unit 18–20 is advantageously a telematic terminal of the type known under the trade name "Minitel".

According to advantageous embodiments, but not indispensable, it is possible to provide for displaying on the screen 19, in addition to the above explicited data, certain other information relating also to the telephone calls made from the station P concerned, and in particular the moments of the beginnings of these different calls, these moments being defined by the day, the hour and if necessary the minute.

To this purpose, a clock 22 is associated with the minicomputer 17 and with the memory 16 so as to record in the latter the data enabling said moments to be identified.

In this case, a member 23 for bringing up to date and up to the hour is also provided to maintain the accuracy of the indications delivered by the clock 22.

The above-mentioned means for bringing up to date the clock at 23 and the level of the taxes at 15 can advantageously be actuated from the key board 20, by means of circuits 21 and 17 and connections respectively symbolized by the arrows in dash-lines 30 and 31.

There is also seen in the drawing:

at 24, an external source of electrical energy which may be the mains and which commits the electrical supply both of the device 7 and the apparatus 18, at 25, a protective circuit enabling inadvertent erasure of the contents of the memory 16 to be avoided or at least to provide a remedy for such erasures, at 26, a "ringing" detector, that is to say more precisely a circuit suitable for detecting a coded call coming through the line 1 from another station for the remote consultation of the contents of the memory 16, the coded calls so detected being adapted to trigger in response the sending of said contents to said line for their display at another station, at 27, a safety circuit enabling the local consultation of the device 7 to be reserved to persons especially authorized to this effect, the interface 21 then only being adapted to couple the device 7 to the apparatus 19 after reception and identification through said circuit 27 of a "pass-word" or other suitable coded signal symbolized by the arrow 28, and at 29, means enabling the optional zero-resetting of the memory 16 by erasing its contents.

It is also possible to provide:

means for totalling the numbers N of taxable units and/or costs NU relating to the different calls displayed on the screen 19 in the course of a predetermined period T, means for adjusting the value T of this period as well as the moment of its starting so as particularly to limit it to a fraction only of that corresponding to a subscription separating the successive voluntary zero-resets of the memory 16, and/or means for displaying in real time on the screen 19 the data relating to a telephone call in progress, and causing the appearance in particular of its progressively increasing cost.

The whole of the constituent circuits of the device 7, that is to say denoted above by the references 13 to 16, 21 to 23 and 25 to 31, are advantageously contained in a small sized casing equipped with two sockets 9 and 10 and hence easy to connect to the general socket 8 or to an auxiliary socket such as 11.

The casing concerned appears, for example, in the form of a rectangular parallelepiped whose thickness is of the order of 3 to 5 cm and whose base, square, has sides of the order of 10 cm.

As of result which, and whatever the embodiment adopted, there is finally obtained a device for providing telephone information whose constitution, operation and advantages are sufficiently clear from the foregoing.

As is self-evident, and as emerges already besides from the foregoing, the invention is in no way limited to those of its types of application and embodiments which have been more especially envisaged; it encompasses, on the contrary, all modifications.

We claim:

1. Device for providing the subscriber of a telephone line with information on the calls and other telephone communication service demanded on the subscriber's line from the corresponding station, said device comprising, connected to said line, beyond the general connection socket of the station to said line, means for detecting the number called and the cost of each call and means for displaying these two data on the spot, said device further comprising, also located on the subscriber's side of the station, means for recording the numbers called corresponding to the communication services demanded by the subscriber successively during the course of a predetermined time period, recording means for recording the successive cost of these communications and means for displaying on a video screen the sequence of the successively called numbers, with the corresponding cost of the respective communication services, in response to a request.

2. Device according to claim 1, wherein the display means are constituted by a telematic terminal of the type known under the trade name "Minitel".

3. Device according to claim 1, comprising in addition clock means to indicate the moments of the starts and/or ends of the successive calls, said moments being defined by the date, the hour and the minute concerned, means for recording these indications and means for displaying the latter at the same time as the corresponding numbers called.

4. Device according to claim 1, wherein the durable recording means comprise electrically reprogrammable memories.

5. Device according to claim 1, wherein the recording means comprise life memories with a protected supply.

6. Device according to claim 1, comprising in addition means for delivering the data which are recorded therein to the telephone line in response to a predetermined coded call.

7. Device according to claim 1, comprising in addition safety means enabling the exclusive reservation to persons authorized of access to the data recorded therein, for the purpose of displaying these data, these means employing in particular the composition of a pass word.

8. Device according to claim 1, comprising in addition means for adjusting at will the value T of the predetermined period as well as the moment of its commencement.

* * * * *